Jan. 21, 1969   E. J. ZDANUK ET AL   3,423,203
TUNGSTEN-INDIUM POWDER BODIES INFILTRATED WITH COPPER
Original Filed May 26, 1966
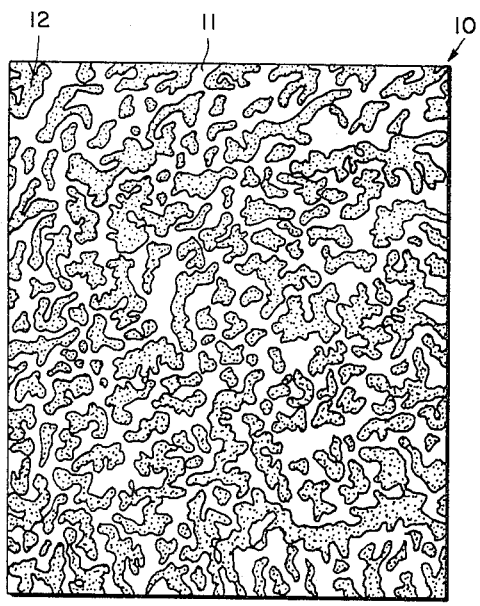
INVENTORS
EDWARD J. ZDANUK
RICHARD H. KROCK
BY Robert Levine
ATTORNEY 3,423,203
TUNGSTEN-INDIUM POWDER BODIES
INFILTRATED WITH COPPER
Edward J. Zdanuk, Lexington, and Richard H. Krock, Peabody, Mass., assignors to P. R. Mallory & Co. Inc., Indianapolis, Ind., a corporation of Delaware
Original application May 26, 1966, Ser. No. 553,154, now Patent No. 3,353,931, dated Nov. 21, 1967. Divided and this application Aug. 21, 1967, Ser. No. 671,182
U.S. Cl. 75—208                                     15 Claims
Int. Cl. B22f 7/00

ABSTRACT OF THE DISCLOSURE

A method of making a composite material comprising the step of providing a porous body consisting essentially of an admixture of tungsten and indium and contacting the porous body with a molten material consisting essentially of copper in a vacuum environment so as to substantially completely infiltrate the porous body with the molten material thereby forming a composite material consisting essentially of tungsten and an alloy of copper-indium.

---

This is a division of application Ser. No. 553,154, filed May 26, 1966, now Patent No. 3,353,931.

The present invention relates to powder metallurgy and more particularly to improved means and methods of providing composite materials for use as an electrical contact material.

It was found by using vacuum infiltration techniques and compacting blended tungsten and indium powders to form a composite skeleton, the indium wets individual particles of tungsten so as to allow infiltration of the powder body with copper. It is believed that the resultant composite body has a high concentration of indium in the interface region between the tungsten particles and the resultant copper-indium alloy matrix thereby raising the overall electrical conductivity of the copper-indium alloy matrix. The use of vacuum infiltration techniques also decreases the volume of hydrogen present in the resultant tungsten-copper-indium composite by more than an order and decreases the volume of all gaseous components by several orders.

Although complete and substantially instantaneous infiltration of copper into sintered tungsten bodies is conveniently carried out in an atmosphere of hydrogen, a copper melt shows no penetration into tungsten powder bodies in a vacuum atmosphere using comparable time-temperature treatments and using standard metallurgical procedures. In carrying out the present invention it was found that blending powdered tungsten with powdered indium and compacting the blended powders so as to form a composite skeleton and subjecting the composite and contacting copper to a vacuum infiltration process, the copper was absorbed into the tungsten-indium body by capillary attraction. It is thought that the indium promotes wetting of the tungsten particles by the copper-indium alloy.

Tungsten is used in electrical contact materials because of its inherent characteristics of hardness and of resistance to arcing which reduce pitting of the tungsten contact material. However, pure tungsten contact material possesses high electrical resistance which lowers the efficiency and reliability of the tungsten contact material.

It has been suggested that a composite of tungsten-copper used as an electrical contact material would make advantageous use of the several outstanding characteristics of both metals. In the composite, the copper provides the current carrying capability and thermal conductivity while the tungsten contributes hardness, resistance to arc erosion, and superior anti-weld properties. In order to utilize the aforementioned characteristics of the copper and the tungsten, it is necessary to fabricate the metal into a tungsten-copper composite.

Copper and tungsten are mutually insoluble and form no alloys in the metallurgical sense, but mixtures of the two metals are usually referred to as alloys but are, technically speaking, composites. Composites of tungsten-copper may be prepared by pressing the mixed metal powders to the required shape in dies, and subsequently sintering in a hydrogen atmosphere above the melting point temperature of the copper, preferably between 1250° and 1350° centigrade. The hydrogen acts as a flux and the molten copper wets the tungsten particles and cements them together. Another method which provides a harder resultant body consists of first pressing and sintering the tungsten powder so as to form a coherent but porous body, which is then heated at a temperature of about 1200° C. to 1300° C. in a hydrogen atmosphere and in contact with molten copper. The copper is absorbed into the pores of the tungsten powder body by capillary attraction. The copper infiltrant imparts strength and ductility to the tungsten powder body and also provides the resultant body with higher current carrying capability and thermal conductivity. However, using standard metallurgical procedures, a copper melt shows no penetration into the tungsten powder body in a vacuum. It is thought that the lack of penetration of the copper into the tungsten powder body is due to the unfavorable surface energies that are present in the vacuum.

If there is no solubility between the metals as is the situation between tungsten and copper, and if the wetting is poor, an auxiliary agent for influencing the surface energies in the desired direction is required.

It was found that by utilizing small amounts of indium and by using vacuum infiltration techniques a melt of copper completely infiltrated the tungsten-indium powder body thereby forming a composite of tungsten particles surrounded by an alloy matrix of copper-indium. It is thought the indium either raises the surface energies of the melt or of the solid, or lowers the surface energy of the interface between the melt and the solid thereby favoring infiltration of the melt into the tungsten-indium powder body. It is thought the vacuum serves the dual purpose of allowing penetration of the copper into the composite powder body and of significantly decreasing the volume of all gases present. However, the resultant tungsten-copper-indium contact material must contain a low volume of gas before the material is acceptable for application in vacuum environments.

In addition it was found that when an alloy of copper-indium was used, vacuum infiltration of copper-indium into presintered or green tungsten bodies was incomplete. For example, using a copper-5 percent, by weight, indium alloy, infiltration occurred only to about 1 millimeter below the surface of the compact using a time-temperature treatment of about 1 hour at 1250° C. This result would seem to indicate that blending indium with tungsten prior to vacuum infiltration is critical.

Therefore, it is an object of the present invention to provide a composite material suitable for use as a contact material in vacuum electrical switching devices.

Another object of the present invention is to provide a composite material of tungsten particles in a matrix of copper-indium for use as an electrical contact material wherein the high electrical conductivity of the copper is not substantially decreased by the addition of indium.

Yet another object of the present invention is to provide a means and method of vacuum infiltrating a compact with an electrically conducting material thereby providing a composite contact material which is low in gas content and low in material which may be converted to gas during operation of the contact.

Yet still another object of the present invention is to provide means and methods of using copper as infiltration stock for tungsten-indium powder bodies so as to allow complete vacuum infiltration of the tungsten-indium powder body thereby providing a composite contact material having integrally joined tungsten-copper-indium materials.

A further object of the present invention is to provide means and methods of fabricating a composite contact material using vacuum infiltration techniques, the composite contact material having high electrical and thermal conductivity, combined with low erosion under arcing and low deformation under pressure environments.

Another object of the present invention is to provide an agent that wets the tungsten, that is ductile, that has high electrical and thermal conductivity, and includes a melting point that is lower than tungsten.

The present invention, in another of its aspects, relates to novel features of the instrumentalities of the invention described herein for teaching the principal object of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description and in the appended claims.

In the drawings:

The figure is a photomicrograph of about 500 magnifications of a tungsten-copper-indium composite contact material showing a tungsten-indium specimen completely vacuum infiltrated with copper. The tungsten-indium specimen contains about 5 percent, by weight, indium. The infiltration was carried out at 1250° C. for 1 hour at a pressure of $10^{-5}$ torr.

Generally speaking, the means and methods of the present invention relate to an electrical contact material for use in a switching device such as, for example, in a vacuum electrical power switching means. The contact material consists of a tungsten-indium body completely vacuum infiltrated by copper. The tungsten-indium body consists of about 5 to 0.5 percent, by weight, indium, the remainder tungsten.

The method of making a tungsten-indium body infiltrated with copper comprises the steps of compacting powdered tungsten and indium particles into a desired body shape. The tungsten-indium body is contacted with copper which when heated above the melting point of both the copper and the indium so as to make use of the indium as an agent for wetting the tungsten particles. The tungsten-indium body and the contacting copper are placed in a vacuum atmosphere and heated so as to completely vacuum infiltrate the tungsten-indium body with the copper by capillary attraction thereby forming a composite contact material of tungsten particles surrounded by an alloy matrix of copper-indium.

More particularly, the means and methods of the present invention relate to fabricating a tungsten-indium body infiltrated with copper for use as an electrical contact in vacuum environments. The tungsten and the indium powders have a particle size ranging between 1 and 10 microns and are blended and compacted under pressure ranging from 20 to 35 tons per square inch into a desired body shape. The tungsten-indium body may be presintered in a hydrogen atmosphere at about 1250° centigrade for about 10 minutes. The surfaces of the sintered tungsten-indium body are contacted with copper. The tungsten-indium body consisted of about 5 to 0.5 percent, by weight, indium, the remainder tungsten. The indium is used to promote the wetting of the tungsten particles by the copper-indium alloy. The tungsten-indium body and the contacting copper are placed in a vacuum atmosphere having a pressure of about $10^{-5}$ torr and heated at a temperature of about 1250° and 1450° centigrade for a time duration of between 20 minutes and 60 minutes.

The tungsten-indium body is completely vacuum infiltrated with copper thereby forming a tungsten-copper-indium composite for use as a contact material in vacuum environments. The tungsten particles are surrounded by a matrix of an alloy of copper-indium.

Exceeding 5 percent, by weight, indium in the tungsten-indium compact detrimentally affects the electrical conductivity of the resultant composite such that the composite no longer has optimum electrical conductivity characteristics. It is recognized, however, that if electrical conductivity of the resultant composite is not a consideration, but rather, it is desired to optimize some other property or properties of the resultant composite, more or even less indium than taught herein may be used. However, it was found that less than 0.5 percent, by weight, indium seriously reduces the rate of infiltration of the compact by the copper. However, complete infiltration of the compact by the copper may be achieved by a much longer and hence impractical time-temperature cycle.

In carrying out the present invention, it was found that for a tungsten-copper system, a composite skeleton of tungsten-indium having small amounts of indium when brought into contact with copper in a heated vacuum environment resulted in the copper completely infiltrating the tungsten-indium powder body and forming a dense composite material. It is thought that the small amount of indium is sufficient to either raise the surface energies of the melt or of the tungsten particles or lower the surface energy of the interface between the melt and the solid.

The resultant composite is dense and has high electrical and thermal conductivity combined with a high resistance to deformation under pressure.

In forming the tungsten-indium powder body, a suitable mold is utilized to form the blended tungsten and indium powders into a desired shape. The size of the particles of tungsten and the size of the particles of indium may vary in accordance with the desired density of the composite contact material and with the desired pore size distribution of the composite contact material. For illustrative purposes, tungsten powder and indium powder having a particle size of about 1 micron to 10 microns is utilized. However, it should be understood that tungsten powder and indium powder having a larger or a smaller particle size may be used.

The tungsten particles and the indium particles are compacted within the confines of a suitable mold by a compacting pressure ranging between 20 and 35 tons per square inch thereby forming a porous tungsten-indium composite body. If it is desired to further strengthen the tungsten-indium composite body prior to infiltration and/or provide a composite having a higher tungsten-indium content, the tungsten-indium composite body may be sintered in an atmosphere of hydrogen at a temperature of about 1250° C. for a time duration of about 10 minutes. FIGURE 1 shows a composite structure wherein the tungsten compact was presintered. After the preparatory treatment is complete, the strength of the tungsten-indium compact is materially increased, and the compact can be handled readily. Very little grain growth takes place during the presinter treatment, and the increase in strength of the compact may be due to the reduction of the surface film of oxide on the individual tungsten particles, the reduced metal acting as a cement which binds the tungsten particles together.

It should be pointed out that the presinter of the tungsten compact in the hydrogen atmosphere is not a necessary prerequisite to the successful infiltration of the tungsten-indium powder body with copper.

The tungsten-indium specimen, presintered or not, containing about 5 to 0.5 percent, by weight, indium is placed in a vacuum having a pressure of $10^{-5}$ torr or less and contacted with copper. The tungsten-indium specimen and the contacting copper are heated to a temperature of between about 1200° C. to 1450° C. The range of temperatures exceeds the 1083° C. melting point temperature of the copper and the 150° C. melting point temperature of indium, but is below the 3410° C. melting point temperature of tungsten.

A chemical analysis of the resultant composite body showed that vacuum processing decreases the volume of hydrogen by more than an order and decreases the volume of other gaseous components by several orders.

Referring to the drawings, FIGURE 1 illustrates a tungsten-copper-indium composite 10 consisting of a sintered porous compact of tungsten particles 11 which has been completely infiltrated by a coherent network of copper-indium 12. The metal surfaces of the copper-indium mixture are integrally bonded with the tungsten particles. The tungsten-indium compact prior to vacuum infiltration contains about 5.0 percent, by weight, indium. During vacuum infiltration, the porous tungsten-indium body and the contacting copper were subjected to a temperature of about 1250° C. for about 60 minutes at a pressure of 10⁻⁵ torr, or less.

The following Examples 1 to 4 are illustrative of the preparation of a tungsten-copper-indium contact material by vacuum infiltration of a tungsten-indium powder body with copper.

Example 1

A sintered tungsten-indium body completely vacuum infiltrated by copper, the sintered body containing about 5.0 percent, by weight, indium, the remainder tungsten.

Powdered tungsten and powdered indium having a particle size of about 1 to 10 microns was pressed by any suitable means such as by an automatic press at about 20 tons per square inch to provide a green compact sturdy enough to be handled. The green compact contained about 5.0 percent, by weight, indium. The green compact was presintered at about 1250° C. for about 10 minutes in an atmosphere of hydrogen so as to form a skeleton type structure. The presintering of the compact serves to increase the strength of the compact by cementing the metallic particles each to the other thereby binding them together. The sintered porous compact is contacted with copper. The sintered tungsten compact and the contacting copper were placed in a vacuum atmosphere having a pressure of about 10⁻⁵ torr of less and were heated at a temperature of about 1250° C. for a time duration of about 1 hour. Also, an individual tungsten-copper-indium composite was prepared using a time-temperature treatment of about 1450° C. for about 20 minutes using the procedure of Example 1. In each instance the porous tungsten-indium body was found to be completely vacuum infiltrated by the copper. The resultant tungsten-copper-indium composite is illustrated in FIGURE 1 of the drawing.

Example 2

A green tungsten-indium powder body completely vacuum infiltrated by copper, the green compact containing about 5.0 percent, by weight, indium, the remainder tungsten.

Powdered tungsten and powdered indium having a particle size of about 1 micron to about 10 microns were blended and pressed by any suitable means such as by an automatic press at about 20 tons per square inch to provide a green compact sturdy enough to be handled. The porous green compact includes an indium content of about 5.0 percent, by weight, indium, the remainder tungsten. The green compact was contacted with copper. The green tungsten-indium compact and the contacting copper were placed in a vacuum atmosphere having a pressure of 10⁻⁵ torr or less, and were heated at about 1250° centigrade for about 1 hour. In addition, an individual tungsten-copper-indium composite was prepared using a time-temperature treatment of about 1450° centigrade for about 20 minutes using the procedure of Example 2. In each instance the porous tungsten-indium body was found to be completely infiltrated by the copper.

Example 3

A sintered tungsten-indium body completely vacuum infiltrated by copper, the tungsten-indium body containing about 0.5 percent, by weight, indium, the remainder tungsten.

Powdered tungsten and powdered indium having a particle size of about 1 micron to about 10 microns were blended and pressed by any suitable means such as by an automatic press at about 20 tons per square inch to provide a green compact sturdy enough to be handled. The green compact was sintered at a temperature of about 1250° centigrade for about 10 minutes in a hydrogen atmosphere. The sintered tungsten-indium body contained about 0.5 percent, by weight, indium, the remainder tungsten. The sintered porous tungsten-indium compact is contacted with copper. The sintered tungsten-indium compact and the contacting copper were placed in a vacuum atmosphere having a pressure of 10⁻⁵ torr or less and heated at about 1450° centigrade for about 20 minutes. Also, an individual tungsten-copper-indium composite was prepared using a time-temperature treatment of about 1250° centigrade for about 1 hour using the procedure of Example 3. In each instance the porous tungsten body was found to be completely infiltrated by the copper.

Example 4

A green tungsten-indium body completely vacuum infiltrated by copper, the tungsten-indium body containing about 0.5 percent, by weight, indium, the remainder tungsten.

The green compact was formed following the procedure of Example 3 using a tungsten-indium powder body containing about 0.5 percent, by weight, indium. Individual composites without any presintering were prepared using a time-temperature treatment of 1250° centigrade for 1 hour and 1450° centigrade for 20 minutes. In each instance the porous tungsten body was found to be completely infiltrated by the copper.

It is thought that the tungsten powder may be coated with indium by electroplating or vapor phase plating. Vacuum impregnation will occur as long as indium is at the boundary. The amount of plated indium would be such that its composition would amount to 5 to 0.5 percent by weight of the tungsten.

The present invention is not intended to be limited to the disclosure herein, and changes and modifications may be made by those skilled in the art without departing from the spirit and the scope of the present invention. Such modifications and variations are considered to be within the purview and the scope of the present invention and the appended claims.

Having thus described our invention, we claim:

1. A method of making a tungsten powder body infiltrated with an alloy of copper for use as an electrical contact material in vacuum environments comprising the steps of compacting tungsten and indium particles into a desired body shape, said indium for promoting the wetting of said tungsten particles; contacting the surfaces of the compacted tungsten-indium body with copper, placing said tungsten-indium body and said contacting copper in a vacuum atmosphere; and heating said tungsten-indium body and said contacting copper so as to completely vacuum infiltrate said tungsten body with an alloy of copper-indium thereby forming a composite material for use as a contact material in a vacuum switching device.

2. The method according to claim 1 wherein said tungsten particles are contacted with said indium by electroplating.

3. The method according to claim 1 wherein said tungsten body is contacted with said indium by vapor phase plating.

4. The method according to claim 1 wherein said tungsten-indium composite consists of about 5.0 to 0.5 percent, by weight, indium, the remainder tungsten.

5. The method according to claim 1 wherein said vacuum atmosphere has a pressure of not more than $10^{-5}$ torr.

6. The method according to claim 1 wherein said heating is to a temperature of between about 1250° C. and 1450° C. for a time duration of between about 20 minutes and 60 minutes.

7. The method according to claim 1 wherein the particle size of said tungsten and said indium is between about 1 to 10 microns.

8. The method according to claim 1 wherein the compacting pressure is about 20 tons per square inch.

9. The method according to claim 1 including the additional step of sintering said compacted tungsten-indium body in a hydrogen atmosphere of about 1250° C for a time duration of about 10 minutes.

10. A method of making a tungsten powder body infiltrated with an alloy of copper-indium for use as an electrical contact material in vacuum environments comprising the steps of: compacting blended tungsten powder and indium powder having a particle size ranging between 1 and 10 microns under a pressure ranging from 20 to 50 tons per square inch into a desired body shape, said tungsten-indium powder body consisting of about 5.0 to 0.5 percent, by weight, indium, said indium promoting the wetting of the tungsten particles; sintering said compacted tungsten-indium body in a vacuum; contacting the surfaces of said sintered tungsten-indium body with copper; placing said tungsten-indium body and said contacting copper in a vacuum with a pressure of less than $10^{-5}$ torr; and heating said tungsten-indium body and said copper at a temperature of between 1250° C. and 1450° C. for a time duration of between about 20 minutes and 60 minutes so as to completely vacuum infiltrate said tungsten body with an alloy of copper-indium thereby forming a tungsten-copper-indium composite material for use as a contact material in a vacuum switching device.

11. A method of making a composite material comprising the steps of
providing a porous body consisting essentially of an admixture of tungsten and indium, and
contacting said porous body with a molten material consisting essentially of copper in a vacuum environment so as to substantially completely infiltrate said body with said molten material thereby forming a composite material consisting essentially of tungsten and an alloy of copper-indium.

12. The method of claim 11, wherein said vacuum environment has a pressure of $10^{-5}$ torr or harder and a temperature sufficient to initiate sintering of said tungsten.

13. The method of claim 11, wherein said porous body consists essentially of about 0.5 to about 5.0% by weight indium, the remainder tungsten.

14. The method of claim 13, further including the steps of compacting said porous body prior to contacting said porous body with molten copper.

15. The method of claim 13 wherein said compacting pressure is about 20 tons per square inch.

References Cited

UNITED STATES PATENTS

| | | | |
|---|---|---|---|
| 2,596,454 | 5/1952 | Williams | 75—153 |
| 3,303,559 | 2/1967 | Holtzclaw | 29—182.1 X |

CARL D. QUARFORTH, *Primary Examiner.*

A. J. STEINER, *Assistant Examiner.*

U.S. Cl. X.R.

75—225; 29—182.1